(12) United States Patent
Tanaka

(10) Patent No.: US 9,094,911 B2
(45) Date of Patent: Jul. 28, 2015

(54) DATA COMMUNICATION SYSTEM, METHOD OF OPTIMIZING PREAMBLE LENGTH, AND COMMUNICATION APPARATUS

(75) Inventor: Hitoshi Tanaka, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 13/545,977

(22) Filed: Jul. 10, 2012

(65) Prior Publication Data

US 2013/0016762 A1     Jan. 17, 2013

(30) Foreign Application Priority Data

Jul. 12, 2011    (JP) ................................. 2011-153951

(51) Int. Cl.
    *H04L 7/00*         (2006.01)
    *H04W 56/00*      (2009.01)
    *H04W 28/06*      (2009.01)

(52) U.S. Cl.
    CPC .......... *H04W 56/0085* (2013.01); *H04W 28/06* (2013.01)

(58) Field of Classification Search
    CPC ....... H04L 7/0008; H04L 7/02; H04L 7/0331; H04L 7/0337; H04L 7/033; H04L 7/04; H04L 27/2601; H04L 1/0025; H04W 56/0085; H04W 28/06; H04B 1/38; H04B 1/40; H04B 3/23; H04B 1/403
    USPC .................................. 375/354, 316, 295, 219
    See application file for complete search history.

(56) References Cited

U.S. PATENT DOCUMENTS

| | | | |
|---|---|---|---|
| 8,594,018 B2 * | 11/2013 | Richards et al. | 370/328 |
| 2003/0147374 A1 * | 8/2003 | Chiu et al. | 370/349 |
| 2007/0160174 A1 * | 7/2007 | Yang et al. | 375/368 |

(Continued)

FOREIGN PATENT DOCUMENTS

| | | |
|---|---|---|
| JP | H06-133002 A | 5/1994 |
| JP | 2010-171746 A | 8/2010 |

(Continued)

OTHER PUBLICATIONS

Japanese Office Action issued on Mar. 24, 2015, with English Translation.

*Primary Examiner* — Zewdu Kassa
(74) *Attorney, Agent, or Firm* — Rabin & Berdo, P.C.

(57) ABSTRACT

A frame is effectively transmitted and received by setting an optimal preamble length according to transmission environments between communication apparatuses. A data communication system includes a synchronization detection part to detect bit synchronization based on the preamble of the frame received to the second communication apparatus from the first communication apparatus, a synchronization position information generating part to generate synchronization position information of a position of the bit synchronization, which is in the frame received in the second communication apparatus, detected by the synchronization detection part, a preamble length calculating part to calculate an optimal value of a length of the preamble based on the synchronization position information, and a transmit command issuing part to issue a transmit command of transmission of the frame including the preamble having the length based on the optimal value from the first communication apparatus to the second communication apparatus.

14 Claims, 6 Drawing Sheets

(56) References Cited

U.S. PATENT DOCUMENTS

2010/0214985 A1* 8/2010 Chun et al. ............... 370/328
2011/0080902 A1* 4/2011 Jang ........................ 370/344
2012/0020420 A1* 1/2012 Sakoda et al. ............. 375/259

FOREIGN PATENT DOCUMENTS

| JP | 2010-252049 A | 11/2010 |
| JP | 2011078039 A | 4/2011 |

* cited by examiner

DATA COMMUNICATION SYSTEM, METHOD OF OPTIMIZING PREAMBLE LENGTH, AND COMMUNICATION APPARATUS

BACKGROUND OF THE INVENTION

1. Field of the Invention

The present invention relates to a data communication system capable of transmitting and receiving a frame, which contains a preamble, an SFD, and data in that order, between communication apparatuses, a method of optimizing the preamble length of the data communication system, and a communication apparatus.

2. Description of the Related Art

In general, a data communication system makes data in the form of a frame (or package) and transmits and receives the data. As shown in FIG. 1, the frame has a structure in which a preamble, a start frame delimiter (SFD), a data length, an address, data, and a cyclical redundancy check (CRC) are positioned in that order from a header. The preamble is a signal pattern to allow a receiver to recognize the beginning of the frame and to provide synchronization timing for the reception of the frame. The SFD is a recognition bit pattern provided between the preamble and the data. The data length represents a length of effective data (address, data, and CRC) in the frame. The address represents the address of the receiver, and may contain the address of a transmitter. The data actually refers to a data body. The CRC is used to check errors occurring during the transmission of the frame.

Since a communication apparatus at a transmitting side transmits a frame in the above-described order from the preamble of the frame, when a communication apparatus at a receiving side receives an arrived frame, the communication apparatus at the receiving side acquires synchronization timing of each bit following the preamble of the frame by detecting the preamble positioned at the header of the frame, and determines according to the synchronization timing if the bit pattern of the next SFD is detected as shown in FIG. 2. If the bit pattern of the SFD has been detected, the data length, the address, the data, and the CRC, which follow the SFD, are acquired and stored.

CITATION LIST

Patent Literature

PTL 1: Japanese Patent Kokai No. 2010-252049

SUMMARY OF THE INVENTION

However, according to the communication system of the related art, since the communication apparatus at the transmitting side of the frame cannot recognize the preamble length required to detect bit synchronization of the frame in the communication apparatus at the receiving side, the communication apparatus at the transmitting side of the frame must transmit a preamble having a sufficiently long length (Needlessly long length), which interrupts the improvement of the throughput (transmission efficiency) of the system.

In order to cope with the problem, patent literature 1 discloses a technology in which the preamble length contained in the frame to be transmitted varies according to the beam pattern of an antenna or the transmission and reception history with a frame transmitter. For example, when a narrow beam pattern is formed with respect to the frame transmitter, a preamble has a shorter length as compared with the length of preamble when the beam pattern is not formed is selected to transmit the frame. In addition, when a frame is transmitted, one of a plurality of preamble types having various preamble lengths according to time elapsed from the previous transmission and reception time of the frame transmitter is selected by making reference to the retained transmitting and receiving history.

However, the technology disclosed in patent document 1 has a problem in that a preamble length optimized to the transmission environment when transmitting a frame cannot be selected because the data transmission environment between the communication apparatus at the transmitting side and the communication apparatus at the receiving side are always varied.

Accordingly, an object of the present invention is made by taking the above problem into consideration, and to provide a data communication system capable of effectively transmitting and receiving a frame by setting the optimal preamble length according to the transmission environment between communication apparatuses, a method of optimizing a preamble length, and a communication apparatus.

In order to accomplish the object of the present invention, according to an aspect of the present invention, there is provided a data communication system including first and second communication apparatuses to transmit and receive a frame, which includes a preamble, an SFD, and data in that order, between the first and second communication apparatuses, a synchronization detection part which detects bit synchronization based on the preamble of the frame received to the second communication apparatus from the first communication apparatus, a synchronization position information generating part which generates synchronization position information of a position of the bit synchronization, included in the frame received in the second communication apparatus, detected by the synchronization detection part, a preamble length calculating part which calculates an optimal value of a length of the preamble based on the synchronization position information, and a transmit command issuing part which issues a transmit command of transmission of the frame including the preamble having the length based on the optimal value from the first communication apparatus to the second communication apparatus.

According to an aspect of the present invention, there is provided a method of optimizing a length of a preamble in a data communication system including first and second communication apparatuses to transmit and receive a frame, which includes a preamble, an SFD, and data in that order, between the first and second communication apparatuses. The method comprises a synchronization detection step of detecting bit synchronization based on the preamble of the frame received to the second communication apparatus from the first communication apparatus, a synchronization position information generating step of generating synchronization position information of a position of the bit synchronization, included in the frame received in the second communication apparatus, detected through the synchronization detection step, a preamble length calculating step of calculating an optimal value of the length of the preamble based on the synchronization position information, and a transmit command issuing step of issuing a transmit command of transmission of the frame including the preamble having the length based on the optimal value from the first communication apparatus to the second communication apparatus.

According to still another aspect of the present invention, there is provided a communication apparatus to receive a frame which includes a preamble, an SFD, and data in that order. The communication apparatus includes a synchronization detection part which detects bit synchronization based on the preamble of the frame, a synchronization position information generating part which generates synchronization position information representing a position of the bit synchronization, included in the frame, detected by the synchronization detection part, and a transmitting part which transmits a frame to a communication apparatus including a source, which has transmitted the received frame, by making the frame including the data having the synchronization position information or the optimal value so that the communication apparatus including the source obtains an optimal value of a length of the preamble based on the synchronization position information.

As described above, according to the present invention, the bit synchronization for a frame transmitted from the first communication apparatus is detected based on a preamble of the frame received in the second communication apparatus, the synchronization detection position information representing the bit synchronization detection position of the frame received in the second communication apparatus is detected, the optimal value of a preamble length is calculated based on the synchronization detection position information, and a command to transmit a frame including a preamble having a length based on the optimal value from the first communication apparatus to the second communication apparatus is issued. Accordingly, a frame having the optimized preamble length is transmitted from the first communication apparatus to the second communication apparatus. Accordingly, the optimal preamble length can be set corresponding to the transmission environment when the frame is transmitted. In addition, the second communication apparatus receiving the frame can perform the reception of the SFD without an unnecessary receiving period of the preamble after the bit synchronization has been detected. Therefore, since the frame can be effectively transmitted and received between the first and second communication apparatuses, the throughput of the data communication system can be improved.

DETAILED DESCRIPTION OF THE INVENTION

Hereinafter, the embodiment of the present invention will be described in detail with reference to accompanying drawings.

Figure 3:
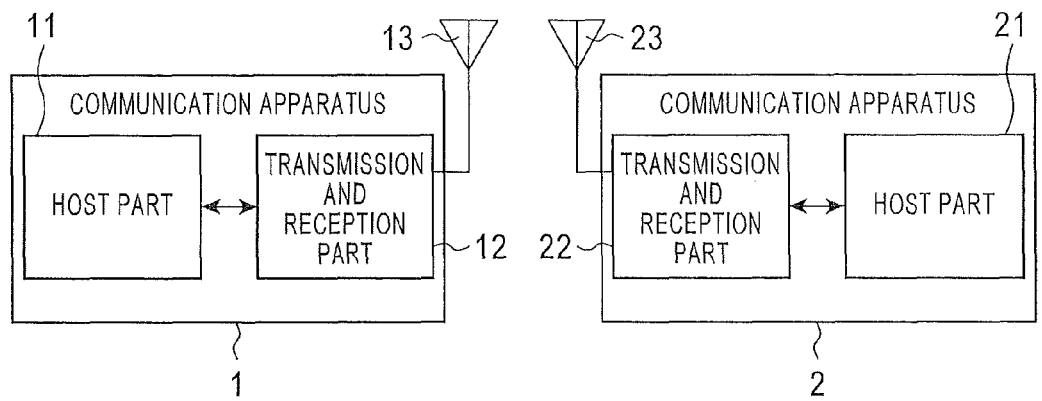
FIG. 3 is a block diagram schematically showing a data wireless communication system according to the present invention.

FIG. 3 is a view showing a data wireless communication system according to the embodiment of the present invention. Although the data wireless communication system includes a plurality of communication apparatuses, FIG. 3 shows two communication apparatuses 1 and 2 for the illustrative purpose only. In this case, the communication apparatus 1 provides data (first communication apparatus), and the communication apparatus 2 receives data from the communication apparatus 1 (second communication apparatus).

The communication apparatus 1 includes a host part 11 and a transmitting and receiving part 12, and the communication apparatus 2 includes a host part 21 and a transmitting and receiving part 22. The host parts 11 and 21 are control circuits including computers. The host part 11 controls the transmitting and receiving part 12 so that the transmitting and receiving part 12 performs a transmit operation when the operating mode is a transmit mode, and controls the transmitting and receiving part 12 so that the transmitting and receiving part 12 performs a receive operation when the operating mode is a receive mode. Similarly, the host part 21 controls the transmitting and receiving part 22 so that the transmitting and receiving part 22 performs a transmit operation when the operating mode is a transmit mode, and controls the transmitting and receiving part 22 so that the transmitting and receiving part 22 performs a receive operation when the operating mode is a receive mode.

The transmitting and receiving parts 12 and 22 include integrated circuits such as LSIs. The transmitting and receiving part 12 performs the transmit operation according to the transmit command of the host part 11 to transmit a frame serving as a wireless signal through an antenna 13. In addition, the transmitting and receiving part 11 performs a receive operation after the transmission of the frame has been finished, receives an arrived frame through the antenna 13, fetches effective data from the frame, and retains the data. Similarly, the transmitting and receiving part 22 performs the transmit operation according to the transmit command of the host part 21 to transmit a frame serving as a wireless signal through an antenna 23. In addition, the transmitting and receiving part 22 performs a receive operation after the transmission of the frame has been finished. In detail, the transmitting and receiving part 22 receives an arrived frame through the antenna 23, fetches effective data from the frame, and retains the data.

Figure 1:
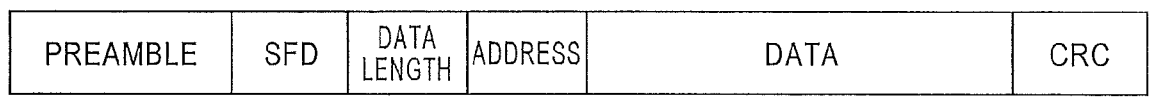
FIG. 1 is a view showing the structure of a frame.
Figure 2:
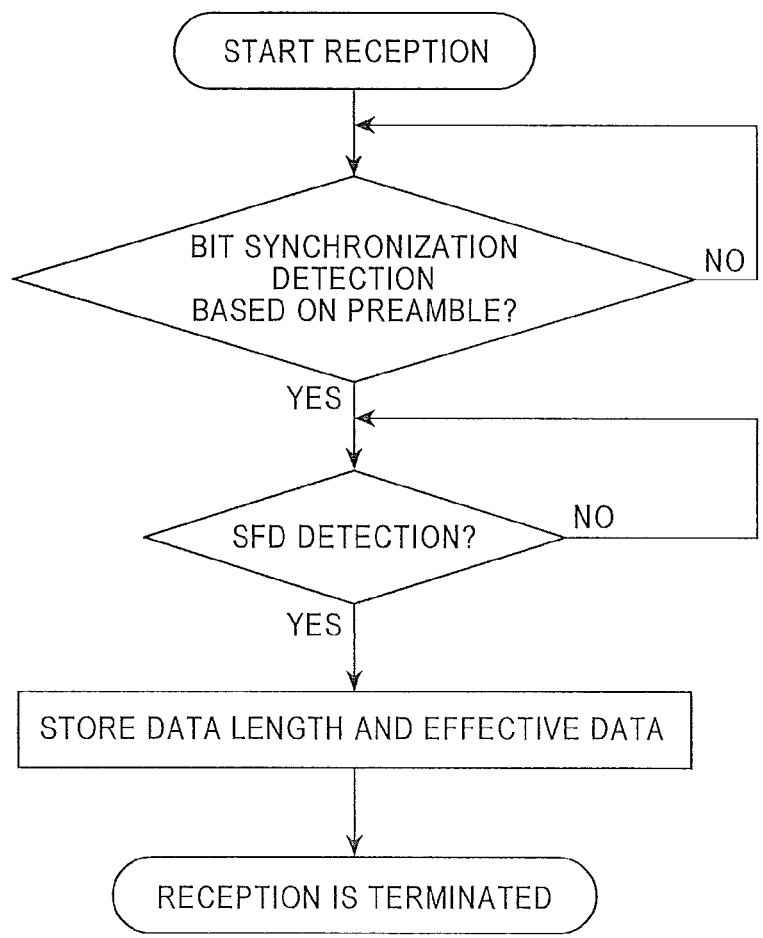
FIG. 2 is a flowchart showing an operation of receiving a frame in a wireless communication system according to the related art.

The frame to be transmitted and received has a structure in which a preamble, an SFD, a data length, an address, data, and a CRC as shown in FIG. 1. Repeatedly, the preamble has a signal pattern allowing a receiving side to recognize the beginning of the packet and providing synchronization timing for packet reception. For example, the preamble has a signal pattern having 1 and 0 which are alternately aligned with each other. The SFD is a bit pattern between the preamble and the data. The data length represents the length of effective data (address, data, and CRC) within a packet. The address represents the address of the receiving side. In addition, the address may include the address of the transmitting side. The data actually represents a data body. The data contains a synchronization signal pattern (reference timing signal pattern) serving as a kind of data representing reference timing. The CRC is a value used to check errors occurring during the transmission of the packet.

Figure 4:
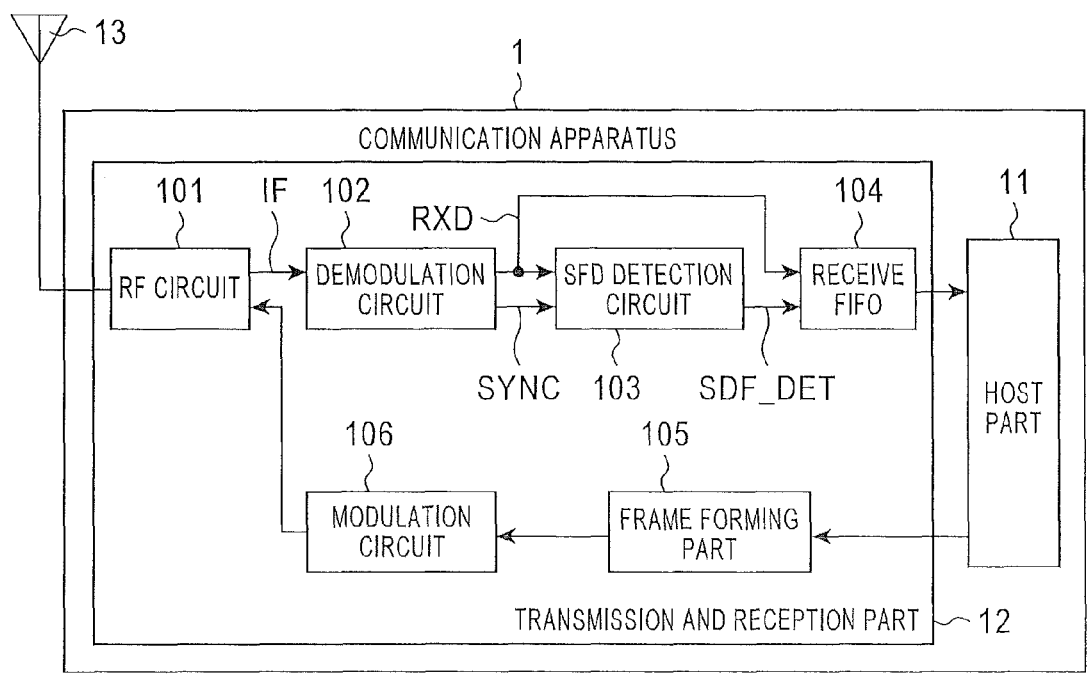
FIG. 4 is a block diagram showing the structure of a transmitting and receiving part of a communication apparatus at a side of providing data.

As shown in FIG. 4, the transmitting and receiving part 12 of the communication apparatus 1 includes an RF circuit 101, a demodulation circuit 102, an SFD detection circuit 103, a receive FIFO 104, a frame forming part 105, and a modulation circuit 106.

The RF circuit 101 is connected to the antenna 13. The RF circuit 101 outputs a digital signal including a frame input from the modulation circuit 106 in the form of a wireless signal (RF signal) through the antenna 13 when the frame is transmitted. In addition, when a frame is received, the RF circuit 101 receives a wireless signal input through the antenna 13, frequency-converts the frequency of the wireless signal into the intermediate frequency (IF), and outputs the received signal IF to the demodulation circuit 102. The operating mode of the RF circuit 101 is controlled by the host part 11.

The demodulation circuit 102 is connected to an output of the RF circuit 101 to demodulate the received signal IF, which is input from the RF circuit 101, into a digital signal RXD and to output the digital signal RXD to the SFD detection circuit 103 and the receive FIFO 104. In addition, the demodulation circuit 102 identifies a preamble pattern based on the digital signal RXD resulting from the demodulation. Then, the demodulation circuit 102 sets the detection time of the preamble pattern as synchronization detection time and outputs a bit synchronization detection signal SYNC to the SFD detection circuit 103.

The SFD detection circuit 103 is connected to the output of the demodulation circuit 102, and identifies an SFD pattern based on the digital signal RXD output from the demodulation circuit 102 if the bit synchronization detection signal SYNC is received from the demodulation circuit 102. If the SFD detection circuit 103 has finished the detection of the SFD pattern, the SFD detection circuit 103 notifies the receive FIFO 104 of an SFD detection signal SFD_DET. If the detection of the SFD pattern has been completed, the preamble and SFD fields of the frame are ended, so that an effective data field comes.

The receive FIFO 104 is connected to the outputs of the demodulation circuit 102 and the SFD detection circuit 103 and retains the digital signal RXD output from the demodulation circuit 102, that is, the effective data comprising the data length in the frame output from the demodulation circuit 102, in response to the SFD detection signal SFD_DET output from the SFD detection circuit 103. The output of the receive FIFO 104 is connected to the host part 11, and the data retained in the receive FIFO 104 may be read out by the host part 11.

The frame forming part 105 retains transmit data (preamble, SFD, data length, address, and data), which are contained in a transmit command of the host part 11, in a transmit FIFO (not shown) and forms a frame by adding a CRC to the transmit data according to the transmit command from the host part 11.

The modulation circuit 106 is connected to an output of the frame forming part 105 to modulate the frame input from the frame forming part 105 and to output the modulated frame to the RF circuit 101 for the purpose of transmitting the modulated frame.

Figure 5:
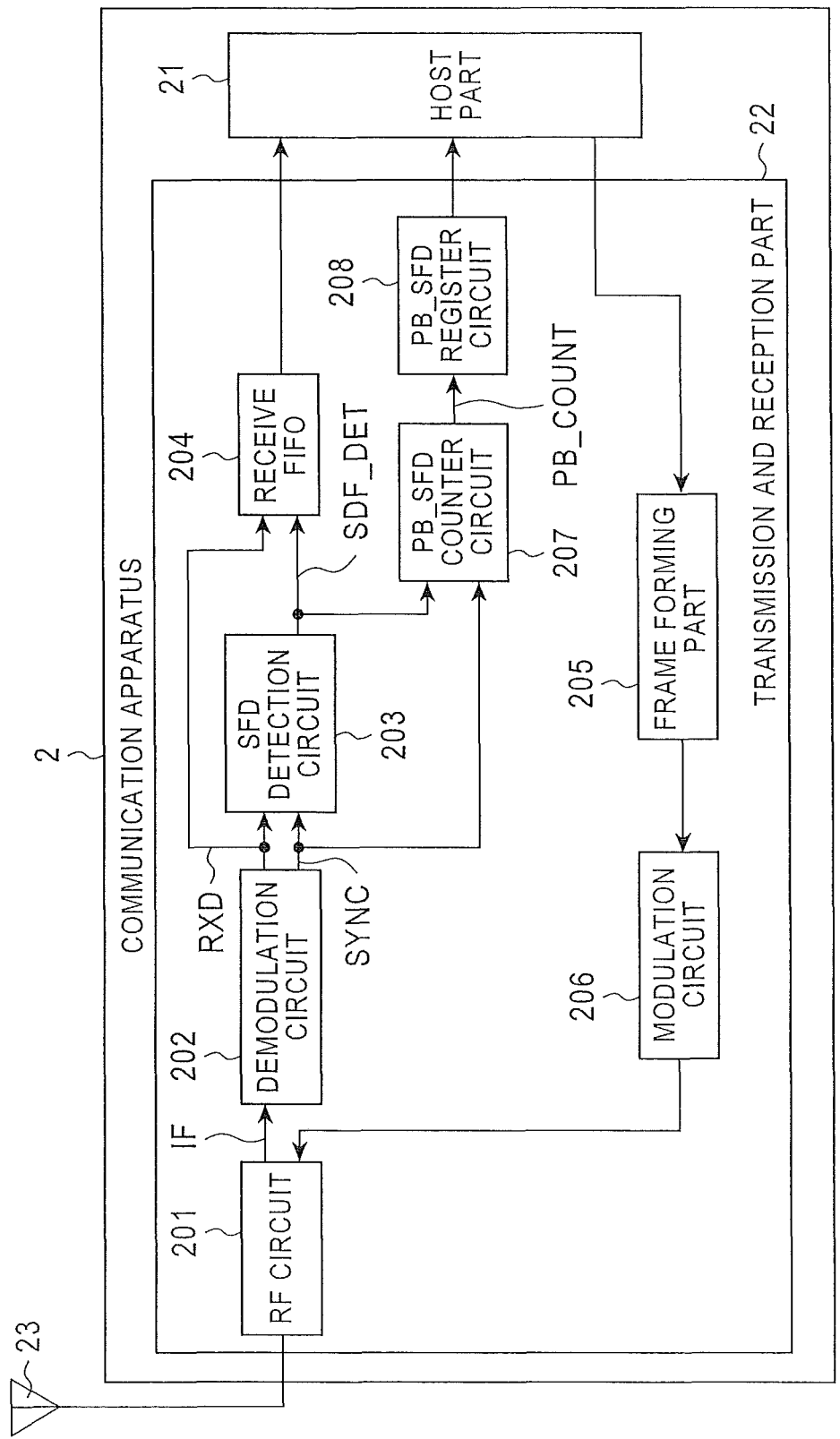
FIG. 5 is a block diagram showing the structure of a transmitting and receiving part of a communication apparatus at a side of receiving data.

As shown in FIG. 5, the transmitting and receiving part 22 of the communication apparatus 2 includes an RF circuit 201, a demodulation circuit 202, an SFD detection circuit 203, a receive FIFO 204, a frame forming part 205, a modulation circuit 206, a PB_SFD counter circuit 207, and a PB_SFD register circuit 208.

Since the RF circuit 201, the demodulation circuit 202, the SFD detection circuit 203, the receive FIFO 204, the frame forming part 205, the modulation circuit 206 perform the same functions as those of the RF circuit 101, the demodulation circuit 102, the SFD detection circuit 103, the receive FIFO 104, the frame forming part 105, and the demodulation circuit 105 of the transmitting and receiving part 12, respectively, the details thereof will be omitted below.

The PB_SFD counter circuit 207 is connected to the outputs of the demodulation circuit 202 and the SFD detection circuit 203. The PB_SFD counter circuit 207 starts a counting operation for clocks in response to the bit synchronization detection signal SYNC input from the demodulation circuit 202, and stops the counting operation corresponding to the SFD detection signal SFD_DET input from the SFD detection circuit 203 so that a count value PB_COUNT obtained at that time is output the PB_SFD register circuit 208. The clocks are generated from a clock generator (not shown) in the transmitting and receiving part 22 and synchronized with the timing of bits of the digital signal RXD output from the demodulation circuit 102. Accordingly, the counted value of the PB_SFD counter circuit 207 represents the number of bits of the digital signal RXD output from the demodulation circuit 102 between time at which the bit synchronization detection signal SYNC is generated and time at which the SFD detection signal SFD_DET is generated.

The PB_SFD register circuit 208 is connected to an output of the PB_SFD counter circuit 207 to store the count value PB_COUNT output from the PB_SFD counter circuit 207. The output of the PB_SFD register circuit 208 is connected to the host part 21, so that the count value PB_COUNT stored in the PB_SFD register circuit 208 may be read out by the host part 21.

In the wireless communication system having the above structure, wireless communication is established between the communication apparatuses 1 and 2, and the frame constituting the wireless signal is transmitted from the communication apparatus 1 at the data providing side to the communication apparatus 2.

Figure 7:
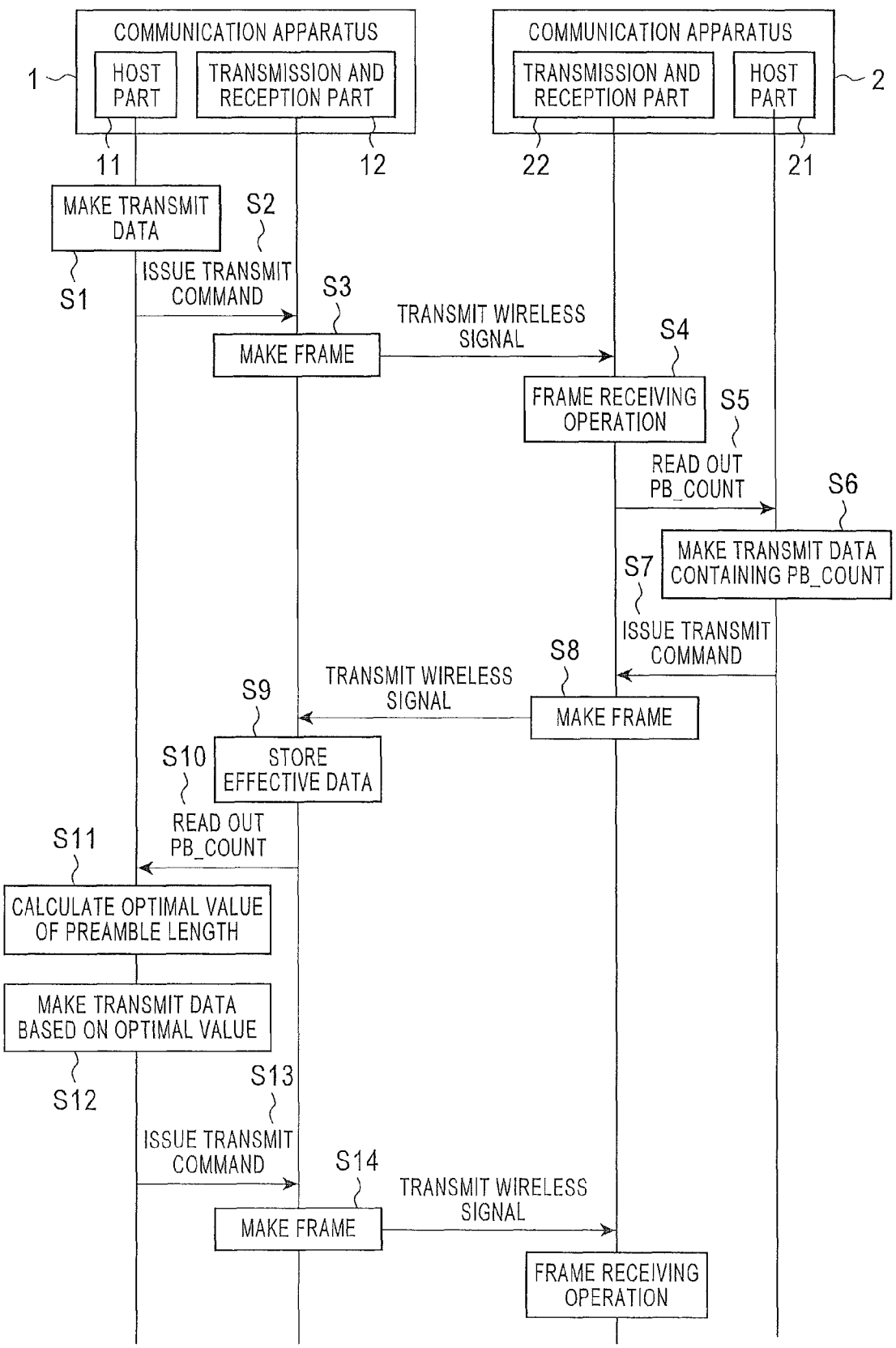
FIG. 7 is a view showing the sequence of the transmitting and receiving operation of a frame in the system of FIG. 3.

As shown in FIG. 7, the host part 11 of the communication apparatus 1 makes transmit data (preamble, SFD, data length, address, and data) (step S1) and issues a transmit command including transmit data to the transmitting and receiving part 12 (step S2). The transmitting and receiving part 12 makes a frame according to the transmit command and transmits the frame as a wireless signal (step S3). In detail, the frame forming part 105 forms the frame by adding a CRC to the transmit data contained in the transmit command output from the host part 11 according to the transmit command of the host part 11. The preamble length of the frame represents an initial length (byte). For example, if the preamble length is set in the range of 1 bytes to 4 bytes, the preamble length 105 is 4 bytes. The frame received from the frame forming part 105 is modulated by the modulation circuit 106. The frame after the modulation becomes a wireless signal having a predetermined frequency by the RF circuit 101 and transmitted through the antenna 13. The wireless signal is received by the transmitting and receiving part 22 through the antenna 23 in the communication apparatus 2, and effective data comprising the data length in the frame are obtained from the wireless signal through the frame receiving operation (step S4).

Figure 8:
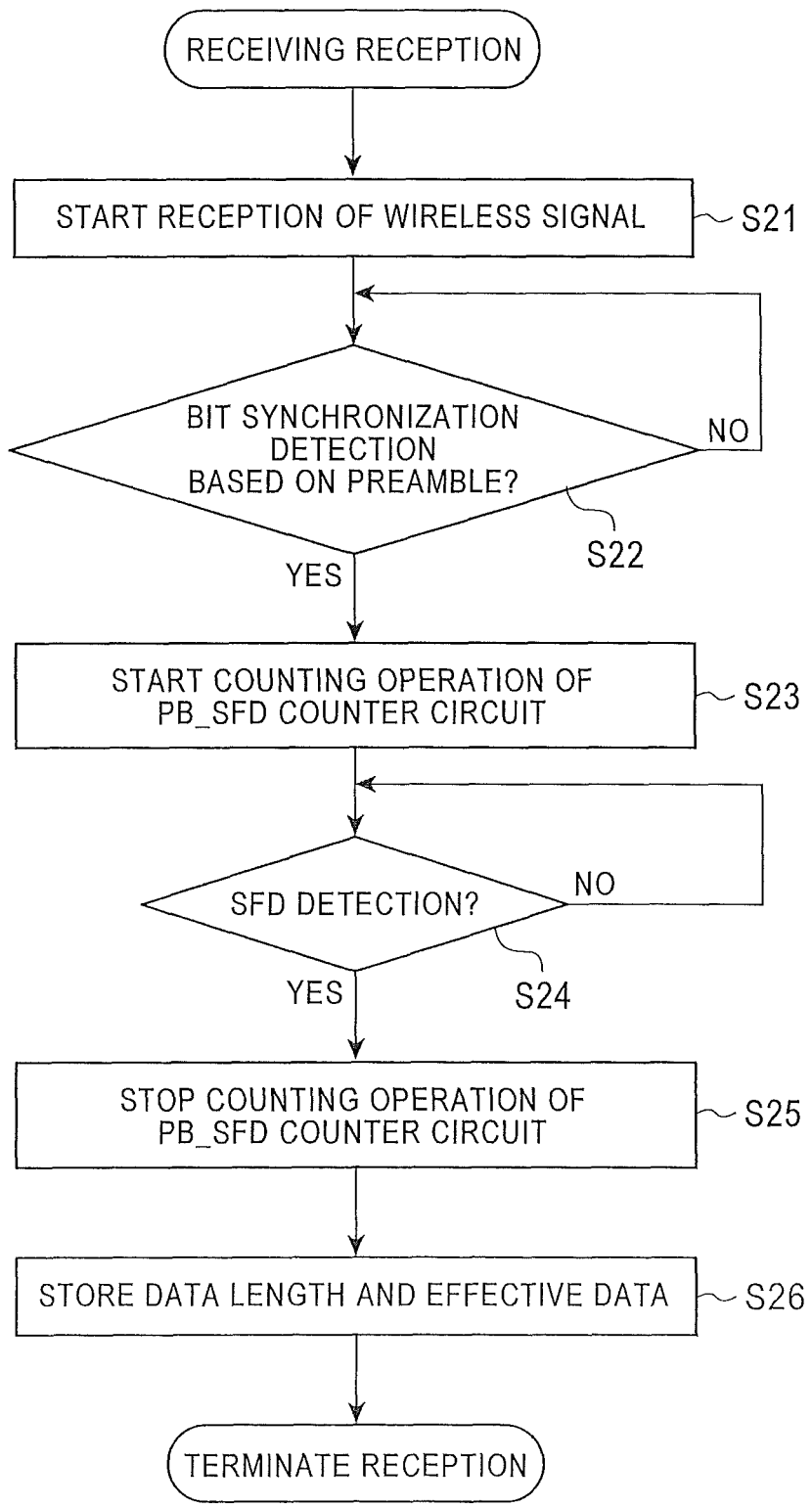
FIG. 8 is a flowchart showing an operation of receiving a frame in a transmitting and receiving part of FIG. 5.

Hereinafter, the frame receiving operation by the transmitting and receiving part 22 will be described with reference to the flowchart of FIG. 8.

Figure 6:
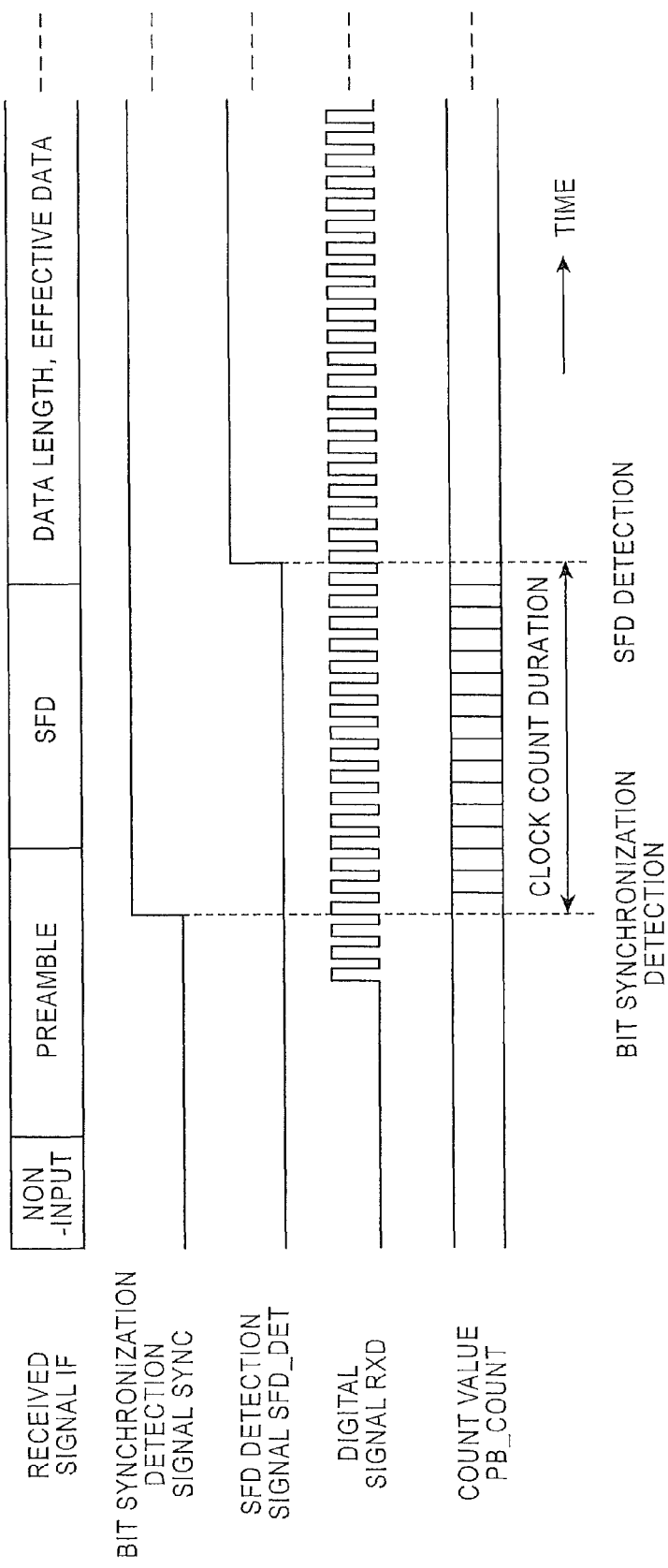
FIG. 6 illustrates the waveform showing the operation of transmitting and receiving part of FIG. 5.

The wireless signal arrived through the antenna 23 is received in the RF circuit 201 (step S21), converted into a receive signal, and supplied to the demodulation circuit 202. The receive signal is demodulated in the demodulation circuit 202 to be the digital signal RXD. The digital signal RXD is output to the SFD detection circuit 103 and the receive FIFO 104. As shown in FIG. 6, the digital RXD represents the bit data of the frame from the non-input state. Since the header of the frame is a preamble, the demodulation circuit 102 starts the acquisition of the synchronization for each bit of the preamble (step S22). If the demodulation circuit 102 acquires the synchronization, high-level bit synchronization detection signal SYNC is generated from the demodulation circuit 102 as shown in FIG. 6. The PB_SFD counter circuit 207 starts the counting of the clocks in response to the bit synchronization detection signal SYNC (step S23).

The SFD detection circuit 203 detects the digital signal RXD corresponding to the SFD of the frame in synchronization with the bit synchronization detection signal SYNC (step S24). If the SFD detection circuit 203 has completely detected the digital signal RXD corresponding to the SFD of the frame, the time point at which the SFD detection circuit 203 has completely detected the digital signal RXD becomes a time point at which the end bit of the SFD is completely detected. As shown in FIG. 6, at this time point, a high-level SFD detection signal SFD_DET is generated from the SFD detection circuit 203. The SFD detection signal SFD_DET is supplied to the receive FIFO 204 and the PB_SFD counter circuit 207.

Since the PB_SFD counter circuit 207 stops the counting operation in response to the SFD detection signal SFD_DET (step S25), the count value PB_COUNT represents the number of bits of the digital signals RXD between time at which the bit synchronization detection signal SYNC is generated and time at which the SFD detection signal SFD_DET is generated, that is, between time at which the bit synchronization is detected and the time at which SFDs are detected. The count value PB_COUNT is stored in the PB_SFD register circuit 208.

In addition, since the receive FIFO 204 starts the storage of the digital signal RXD in response to the SFD detection signal SFD_DET, the receive FIFO 204 stores effective data comprising the data length in the frame received as the wireless signal (step S26). Accordingly, the reception of the frame is terminated.

The host part 21 of the communication apparatus 2 reads out the count value PB_COUNT stored in the PB_SFD register circuit 208 as the information of the position for the synchronization detection at the timing at which the reception of the frame is terminated (step S5), and makes transmit data (preamble, SFD, data length, address, and data) containing the count value PB_COUNT as data (step S6) to issue a transmit command including the transmit data to the transmitting and receiving part 22 (step S7). The transmitting and receiving part 22 makes a frame according to the transmit command to transmit the frame as the wireless signal (step S8). In detail, the frame forming part 205 forms the frame by adding CRC to the transmit data contained in the transmit command according to the transmit command issued from the host part 21. The frame input from the frame forming part 205 is modulated in the modulation circuit 206, and the modulated frame becomes a wireless signal having a predetermined frequency by the RF circuit 201. The wireless signal is transmitted through the antenna 23. In addition, the count value PB_COUNT is contained in a data length field or a data field of the frame made in step S5 while serving as data. Accordingly, the communication 1 at the receiving side of the frame can determine the existence of the count value PB_COUNT.

The wireless signal including a frame containing the count value PB_COUNT therein is received by the transmitting and receiving part 12 through the antenna 13 of the communication apparatus 1, and the effective data comprising the data length in the frame obtained from the wireless signal are stored in the receive FIFO 104 (step S9).

The host part 12 reads out the count value PB_COUNT stored in the receive FIFO 104 at the timing at which the reception of the frame is terminated (step S10), and calculates the optimal value of the preamble length based on the count value PB_COUNT (step S11). In order to calculate the optimal value of the preamble length, the number of reduced bytes=(PB_COUNT−SFD length)/8 is calculated. When the number of reduced bytes is calculated, the digits below decimal points are discarded. The "PB_COUNT−SFD length" represents the number of bits between the time point at which the bit synchronization of FIG. 6 is detected and the time point at which the SFD is started. In this case, 8 bits represent 1 byte. In addition, the optimal value (=initial length−number of reduced bytes) in the preamble length is calculated by using the number of reduced bytes. For example, if the number of reduced bytes represents 1 byte, and the initial preamble length represents 4 bytes, the optimal value of the preamble length represents 3 bytes.

If the optimal value of the preamble length is calculated, the host part 11 makes transmit data based on the optimal value of the preamble length for the transmitting and receiving part 12 (step S12) and issues the transmit command containing the transmit data (step S13). The transmitting and receiving part 12 makes a frame according to the transmit command to transmit the frame as the wireless signal (step S14). In other words, the preamble length of the transmit data (preamble, SFD, data length, address, and data) contained in the transmit command transmitted from the host part 11 becomes the optimal value.

As described above, the communication apparatus 1 sets the optimal preamble length corresponding to the number of bits between time at which the bit synchronization is detected from the frame actually received as the wireless signal in the communication apparatus 2 and the time at which the SFD is detected from the frame, and the frame having the preamble having the optimal length is transmitted as the wireless signal. For this reason, the communication apparatus 2 receiving the wireless signal can perform the reception of the SFD without an unnecessary receiving period of the preamble after the bit synchronization has been detected. Therefore, the optimal preamble length can be set according to the transmission environment when the frame is transmitted. In addition, since the frame can be effectively transmitted and received between the communication apparatuses 1 and 2, the throughput of the data communication system can be improved. In particular, when the communication apparatus 1 continuously transmits the frame, the whole transmission time of data can be reduced.

In addition, according to the embodiment, the demodulation circuit 202 of the communication apparatus 2 corresponds to a synchronization detection part, and the PB_SFD counter circuit 207 corresponds to a synchronization position information generator. The host part 11 of the communication apparatus 1 corresponds to a preamble length calculating part and a transmit command issuing part. In addition, step S22 corresponds to a synchronization detection step, and steps S25 and S5 correspond to a synchronization position information detecting step. In addition, the step S11 corresponds to a preamble length calculating step, and the step S13 corresponds to a transmit command issuing step.

In addition, although the PB_SFD counter circuit 207 counts the number of bits between the time point at which the bit synchronization is detected and the time point at which the SFD is detected according to the embodiment, the present invention is not limited thereto. For example, the number of bits between the time point at which the bit synchronization is detected and the time point at which the data length of the frame is terminated, the number of bits between the time point at which the bit synchronization is detected and the time point at which the address of the frame is terminated, and the number of bits between the time point at which the bit synchronization is detected and the time point at which the frame is terminated may be counted. In addition, the number of bits between the time point at which synchronization detection is started and the time point at which the synchronization is detected may be counted. In other words, only if the time point at which the bit synchronization is detected represents the position of the frame, various counting time points may be used.

In addition, although the optimal value of the preamble length is calculated in the communication apparatus 1 according to the embodiment, the optimal vale of the preamble length may be calculated corresponding to the count value PB_COUNT in the host part 21 of the communication apparatus 2, and, instead of the count value PB_COUNT, the frame containing the optimal length of the preamble length may be transmitted to the communication apparatus 1 as the wireless signal. In addition, the transmitting and receiving part 12 or 22 may calculate the optimal value of the preamble length instead of the host part 11.

In addition, although only the preamble length of the frame transmitted from the communication apparatus 1 to the communication 2 is optimized according to the embodiment, the communication apparatus 1 has the components corresponding to the PB_SFD counter circuit 207 and the PB_SFD register circuit 208, so that the preamble length of the frame transmitted from the communication apparatus 2 to the communication apparatus 1 may be optimized in the same manner. In addition, the scheme of calculating the optimal value of the preamble length is not limited to the method according to the embodiment, but the optimal preamble length can be calculated through various schemes of calculating the optimal value corresponding to the PB_COUNT.

Although a wireless communication system transmitting frames between the communication apparatuses 1 and 2 is employed according to the embodiment, the present invention is not limited. In other words, the present invention is applicable to a wired communication system to transmit the frame serving as a cable signal through a transmission line such as a cable.

This application is based on Japanese Patent Application No. 2011-153951 which is herein incorporated by reference.

What is claimed is:

1. A data communication system comprising:
a transmission apparatus for transmitting a frame in response to a transmission command supplied thereto, and a receiving apparatus for receiving said frame, said frame including a preamble, a start frame delimiter (SFD), and data in that order;
wherein said receiving apparatus includes:
a synchronization detection part which detects bit synchronization based on the preamble of the frame received by the receiving apparatus from the transmitting apparatus;
a synchronization position information generating part which generates synchronization position information of a position of the bit synchronization, included in the frame received in the receiving apparatus, detected by the synchronization detection part, said synchronization position information generating part comprising a counter part to generate a bit number corresponding to a time period between a first time point at which the bit synchronization is detected by the synchronization detection part and a second time point at which the SFD of the frame is detected;

a transmitting and receiving part which transmits a frame including said synchronization position information to said transmission apparatus;
wherein said transmission apparatus includes:
a preamble length calculating part which calculates a number of reduced bytes by subtracting a number of bits of the SFD from said bit number and dividing by the bit number of one byte, and calculates an optimal value of a length of the preamble by subtracting the number of reduced bytes from an initial preamble length; and
a transmit command issuing part which supplies said transmit command of transmission of a frame including a preamble having a length based on the optimal value from the transmission apparatus to the receiving apparatus; and
a transmitting and receiving part which adjusts the preamble length of a frame toward said optimal value and transmits the frame as a wireless signal.

2. The data communication system of claim 1, wherein the bit number generated by the counter part is the synchronization position information.

3. The data communication system of claim 2, wherein the preamble length calculating part calculates the optimal value by reducing a number of bytes of the preamble by a number of bytes based on a value obtained by subtracting a number of bits of the SFD from the bit number.

4. The data communication system of claim 1, wherein said receiving apparatus comprises the synchronization detection part and the synchronization position information generating part, and further comprises a transmit part which transmits a frame, which is made while containing data including the synchronization position information, to said transmission apparatus, and
wherein said transmission apparatus comprises the preamble length calculating part and the transmit command issuing part, and further comprises a part which receives the frame transmitted by the transmit part and extracts the synchronization position information from the frame.

5. The data communication system of claim 1, wherein the frame is transmitted as a wireless signal between said transmission apparatus and said receiving apparatus.

6. A method of optimizing a length of a preamble in a data communication system including first and second communication apparatuses to transmit and receive a frame, which includes a preamble, a start frame delimiter, and data in that order, between the first and second communication apparatuses, the method comprising:
a synchronization detection step of detecting bit synchronization based on the preamble of the frame received by the second communication apparatus from the first communication apparatus, said synchronization position information generating step comprising a counting step to generate a bit number corresponding to a time period between a first time point at which the bit synchronization is detected by the synchronization detection part and a second time point at which the SFD of the frame is detected;
a synchronization position information generating step of generating synchronization position information of a position of the bit synchronization, included in the frame received in the second communication apparatus, detected through the synchronization detection step;
a preamble length calculating step of calculating a number of reduced bytes by subtracting a number of bits of the SFD from said bit number and dividing by the bit number of one byte, and calculates an optimal value of the length of the preamble by subtracting the number of reduced bytes from an initial preamble length; and a transmit command issuing step of issuing a transmit command of transmission of a frame including a preamble having a length based on the optimal value from the first communication apparatus to the second communication apparatus.

7. A communication apparatus to receive a frame which includes a preamble, a start frame delimiter (SFD), and data in that order, the communication apparatus comprising:

a synchronization detection part which detects bit synchronization based on the preamble of the frame that is received;

a synchronization position information generating part which generates synchronization position information representing a position of the bit synchronization, included in the received frame, detected by the synchronization detection part, said synchronization position information generating part comprising a counter part to generate a bit number corresponding to a time period between a first time point at which the bit synchronization is detected by the synchronization detection part and a second time point at which the SFD of the frame is detected; and a transmitting part which transmits a frame to a communication apparatus including a source, which has transmitted the received frame, by making the frame including data having the synchronization position information or the optimal value so that the communication apparatus including the source obtains an optimal value of a length of a preamble based on said bit number.

8. A data communication system comprising:

first and second communication apparatuses to transmit and receive a frame, which includes a preamble, an SFD, and data in that order, between the first and second communication apparatuses;

a synchronization detection means for detecting bit synchronization based on the preamble of the frame received to the second communication apparatus from the first communication apparatus;

a synchronization position information generating means for generating synchronization position information of a position of the bit synchronization, included in the frame received in the second communication apparatus, detected by the synchronization detection means, said synchronization position information generating means comprising a counter means to generate a bit number corresponding to a time period between a first time point at which the bit synchronization is detected by the synchronization detection part and a second time point at which the SFD of the frame is detected;

a preamble length calculating means for calculating a number of reduced bytes by subtracting a number of bits of the SFD from said bit number and dividing by the bit number of one byte, and calculating an optimal value of a length of the preamble by subtracting the number of reduced bytes from an initial preamble length; and a transmit command issuing means for issuing a transmit command of transmission of a frame including a preamble having a length based on the optimal value from the first communication apparatus to the second communication apparatus.

9. The data communication system of claim 8, wherein the synchronization position information generating means comprises a counter means for generating a bit number corresponding to a time period between a first time point at which the bit synchronization is detected by the synchronization detection means and a second time point at which the SFD of the frame is detected, and wherein the bit number generated by the counter means is the synchronization position information.

10. The data communication system of claim 9, wherein the preamble length calculating means calculates the optimal value by reducing a number of bytes of the preamble by a number of bytes based on a value obtained by subtracting a number of bits of the SFD from the bit number.

11. The data communication system of claim 8, wherein the second communication apparatus comprises the synchronization detection means and the synchronization position information generating means, and further comprises a transmit means for transmitting a frame, which is made while containing data including the synchronization position information, to the first communication apparatus, and wherein the first communication apparatus comprises the preamble length calculating means and the transmit command issuing means, and further comprises a means for receiving the frame transmitted by the transmitting means and extracting the synchronization position information from the frame.

12. The data communication system of claim 8, wherein the frame is transmitted as a wireless signal between the first and second communication apparatuses.

13. A communication apparatus to receive a frame which includes a preamble, an SFD, and data in that order, the communication apparatus comprising:

a synchronization detection means for detecting bit synchronization based on the preamble of the frame that is received;

a synchronization position information generating means for generating synchronization position information representing a position of the bit synchronization, included in the received frame, detected by the synchronization detection means, said synchronization position information generating means comprising a counter means to generate a bit number corresponding to a time period between a first time point at which the bit synchronization is detected by the synchronization detection part and a second time point at which the SFD of the frame is detected; and a transmitting means for transmitting a frame to a communication apparatus including a source, which has transmitted the received frame, by making the frame including data having the synchronization position information or the optimal value so that the communication apparatus including the source obtains an optimal value of a length of a preamble based on said bit number.

14. A receiving apparatus for receiving a frame transmitted from a transmission apparatus comprising:

a demodulation circuit which demodulates a received signal, and identifies a preamble pattern based on the demodulated signal, and generates a bit synchronization detection signal when detecting the preamble pattern;

an SFD detection circuit which is connected to the output of said demodulation circuit, and identifies an SFD pattern based on the output signal from said demodulation circuit, and generates an SFD detection signal when finishing the detection of the SFD pattern;

a counter circuit which is connected to the output of said demodulation circuit and said SFD detection circuit, and starts a counting operation for clocks in response to said bit synchronization detection signal from said demodulation circuit, and stops the counting operation corresponding to said SFD detection signal from said SFD detection circuit; and a host part which obtains a count value as synchronization position information, and transmits data containing said count value which is used by said transmission apparatus to adjust a preamble length of a transmitting frame toward an optimal value.

* * * * *